United States Patent Office 2,930,763
Patented Mar. 29, 1960

2,930,763

HYDROCARBON CONVERSION CATALYST

Vladimir Haensel, Hinsdale, Ill., assignor, by mesne assignments, to Universal Oil Products Company, Des Plaines, Ill., a corporation of Delaware No Drawing. Application March 5, 1956
Serial No. 569,279

5 Claims. (Cl. 252—441)

This application is a continuation-in-part of my copending application Serial No. 244,451, filed August 30, 1951, now Patent No. 2,773,011, December 4, 1956, and relates to a novel hydrocarbon conversion catalyst. This catalyst is especially suitable for use in the treatment of hydrocarbons in order to reduce unsaturation and nitrogen content thereof.

Recently commercialized processes for the reforming of low antiknock gasoline fractions, in order to improve the antiknock characteristics thereof, utilize a platinum-containing catalyst. In the preferred process, the catalyst comprises alumina, from about 0.01% to about 1% by weight of platinum and from about 0.1% to about 8% by weight of combined halogen. In other processes, the catalyst may comprise alumina with from about 0.01% to about 1% by weight of platinum, silica-alumina-platinum, etc. It is understood that the platinum concentration may be higher or lower than hereinbefore set forth and may range up to about 10% by weight of the final catalyst.

Regardless of the particular platinum catalyst employed, it has been found that, when reforming a charge stock containing unsaturated compounds and nitrogen compounds, the catalyst appears to be deactivated to a greater extent than when reforming charge stocks substantially free from these constituents. In a preferred embodiment, the present invention is directed to a catalyst which is particularly suitable to the pretreating of a charge stock to a reforming process in order to substantially reduce the unsaturated and nitrogen contents thereof.

In another embodiment the present invention may be employed for the treatment of any hydrocarbon fraction containing unsaturated compounds and/or nitrogen compounds in order to improve the hydrocarbon fraction. In many cases the hydrocarbon fraction also contains sulfur compounds as well as oxygen compounds, and treatment in accordance with the present invention also serves to substantially reduce the content of these components. For example, certain gas oil, fuel oil and other high boiling fractions are utilized as a charging stock for catalytic cracking processes and the components hereinbefore set forth serve to deactivate the cracking catalyst. In accordance with the present invention the charge stock is treated in the manner hereinbefore set forth and thereby is improved as a charge stock for catalytic cracking.

In still another embodiment the catalyst of the present invention may be used for the improvement of hydrocarbon fractions which are used for purposes other than as a charge stock to a subsequent treating or conversion process. For example, kerosene, gas oil or fuel oil distillates may be used as oil for lamps, burner oil, diesel fuel, etc., and the presence of the components hereinbefore set forth may be undesirable because of adversely affecting the burning properties of the oil. By treatment in accordance with the present invention, the content of these undesirable components is reduced and the oil is improved in its burning properties.

In one embodiment the present invention relates to a catalyst for the treatment of a hydrocarbon fraction, said catalyst comprising alumina, platinum and a component selected from the group consisting of alkali metals and compounds thereof.

In another embodiment the catalyst of the present invention is used in a process for the treatment of a hydrocarbon fraction containing olefinic compounds and heterocyclic nitrogen compounds, which comprises subjecting said fraction to treatment with hydrogen in the presence of a catalyst comprising alumina, platinum and a component selected from the group consisting of alkali metals and compounds thereof at a temperature of above about 400° F. and below that at which substantial cracking occurs.

In a specific embodiment the present invention relates to a catalyst for use in a combination process in which a hydrocarbon fraction containing olefinic hydrocarbons and nitrogen compounds is subjected to treatment at a temperature of from about 400° to about 850° F. with hydrogen in the presence of catalyst comprising alumina, platinum and a component selected from the group consisting of alkali metals and compounds thereof, the products are fractionated to separate and remove ammonia, and the resultant products which are substantially reduced in olefinic and nitrogen content are subjected to reforming in the presence of a catalyst comprising alumina, platinum and combined halogen.

It has been found that the addition of the alkali in the catalyst composite serves to reduce the formation of carbonaceous deposits on the catalyst and thereby to prolong the useful life of the catalyst to effect reduction in the content of the undesirable impurities as hereinbefore set forth. Furthermore, it has been found that the addition of the alkali, while serving the important function as hereinbefore set forth, does not substantially reduce the activity of catalyst in effecting the reduction in the content of the undesired components of the hydrocarbon fraction.

When the charge stock is to be subjected to subsequent reforming, the charge stock to the present process will comprise a gasoline fraction, which generally will be a naphtha fraction having an initial boiling point of from about 150° to about 300° F. and an end boiling point of from about 350° to 450° F. or more, although it is understood that a full boiling range gasoline may be used as the charge stock when desired. When the charge stock comprises a cracked hydrocarbon fraction, the charge stock will contain olefinic hydrocarbons. On the other hand, when the charge stock comprises a virgin fraction, it generally will not contain olefinic hydrocarbons. However, the charge stock in either case will contain nitrogen compounds which, as hereinbefore set forth, have a detrimental effect on the platinum-containing reforming catalyst. The nitrogen generally will be present in the form of nitrogen-containing heterocyclic compounds including pyrroles, pyridines, pyrrolidines, piperidines, etc., although it may be present in other forms including aliphatic and/or cyclic amines, etc. Regardless of the combined form in which the nitrogen is present, it serves to detrimentally affect the platinum-containing catalyst.

As hereinbefore set forth, when the charge stock comprises a cracked hydrocarbon fraction, the charge stock will contain unsaturated hydrocarbons including mono-olefins, diolefins, acetylenes, etc. In addition the charging stock may contain sulfur compounds including free sulfur, mercaptans, sulfides, disulfides, etc., heterocyclic sulfur compounds including thiophenes, etc., as well as oxygen-containing compounds. By treatment in accordance with the present invention, the content of the sulfur and oxygen-containing compounds is also reduced along with a reduction in the unsaturated and nitrogen content.

As hereinbefore set forth, the catalyst for use in accordance with the present invention comprises alumina, platinum and alkali metal or compound thereof. In general the platinum will be utilized in a concentration of from about 0.01% to about 1% by weight of the final catalyst. The alkali will be employed in a concentration of not more than about 5% by weight of the catalyst and preferably in a concentration of from about 0.01% to about 1% by weight.

It is understood that the platinum and/or alkali may be present either as the free metal or as a chemical compound or physical association. The platinum may be present as such or as a chemical compound or physical association with the alumina, alkali and/or halogen, when the latter is employed. Similarly, the alkali may be present as such or as a chemical compound or physical association with the alumina, platinum and/or halogen, when employed. The halogen probably is present in a chemical combination with the alumina, platinum and/or alkali.

The catalyst may be prepared in any suitable manner. In general the alumina will be prepared by reacting a suitable basic reagent, including ammonium hydroxide, ammonium carbonate, etc., with a salt of aluminum including aluminum chloride, aluminum sulfate, aluminum nitrate, etc. under conditions to form aluminum hydroxide which upon subsequent heating and drying will form alumina. When a halogen is to be introduced into the catalyst it may be added either before or after the aluminum hydroxide is heated, and the halogen preferably is added in the form of an aqueous solution of the hydrogen halide. Thus, when the halogen comprises fluorine, it is composited as an aqueous solution of hydrogen fluoride, and when it comprises chlorine, it is added as an aqueous solution of hydrogen chloride, etc.

The platinum may be added to the alumina in any suitable manner and generally comprises introducing the platinum as a solution of a platinum salt and particularly chloroplatinic acid, although other suitable solutions of platinum salts may be employed. The alkali preferably is added as an aqueous solution of a suitable salt of the alkali and thus may comprise a chloride, sulfate, nitrate, etc. of lithium, sodium, rubidium and/or cesium. It is understood that the halogen, platinum and/or alkali may be added to the aluminum hydroxide or alumina in any suitable manner and at any step of the catalyst preparation as desired. As a general rule, it is advisable to introduce the platinum at a later step of the catalyst preparation in order that the expensive metal will not be lost due to subsequent processing in the subsequent washing and purification treatments.

After all of the components are composited in the catalyst, the catalyst generally will be dried at a temperature of from about 200° to about 600° F. for a period of from about 2 to 24 hours or more and finally calcined at a temperature of from about 800° to about 1100° F. for a period of from about 2 to 12 hours or more.

In a preferred embodiment, the alumina, either with or without the halogen and/or alkali, is formed into particles of uniform size and shape in any suitable manner including pelleting, extrusion, etc., or into spherical shape by spray drying, oil drop method, etc., and then the platinum is composited therewith. In this embodiment the preformed particles may be subjected to drying and/or calcining prior to compositing the platinum therewith and then subjected to final drying and/or calcining after the platinum has been incorporated.

The hydrocarbon conversion may be effected at any suitable temperature which generally will be in the range of from about 400° to about 850° F. The exact temperature, however, will depend upon the particular charge stock being treated and the specific catalyst employed, but will not exceed that at which substantial cracking occurs. The function of the present process is to reduce in the presence of hydrogen the undesired components but not to effect substantial cracking of the hydrocarbon fraction. The space velocity (defined as the weight of hydrocarbon charge per hour per weight of catalyst in the reaction zone) will be correlated with the temperature to obtain the desired results and in general will be within the range of from about 0.1 to about 20 or more. Similarly, the pressure employed will be correlated with the temperature and space velocity to effect the desired results, and the pressure employed may range from atmospheric to 2000 pounds or more. As hereinbefore set forth, the improved results are obtained in the presence of hydrogen and the concentration of hydrogen will be sufficient for the purpose desired. In general the mol ratio of hydrogen to hydrocarbon will be within the range of from about 0.1 to about 10, although it is understood that lower or higher hydrogen concentrations may be employed when desired.

The effluent products from the reaction zone are subjected to treatment to separate the undesirable impurities and to leave an improved hydrocarbon fraction. The nitrogen-containing compounds, for example, will be converted into ammonia, and the ammonia may be separated and removed from the other products by conventional fractionation, solvent extraction, etc. The unsaturated hydrocarbons will be hydrogenated to saturated hydrocarbons and will remain in the final hydrocarbon products. Sulfur compounds similarly will be converted to hydrogen sulfide and thereby readily removed during the fractionation treatment. The oxygen compounds will be converted into a form readily removable from the treated hydrocarbons.

The hydrocarbon conversion may be effected in any suitable plant equipment. A particularly satisfactory process comprises the fixed bed system in which the catalyst is disposed in a reaction zone, and the hydrocarbon fraction to be treated is passed therethrough in either upward or downward flow. The products are fractionated to separate impurities and excess hydrogen from the desired products. The hydrogen may be separated from the impurities, and the hydrogen preferably is recycled for further use in the process. Other suitable units in which the process may be effected include the fluidized type process in which the hydrocarbons and catalysts are maintained in a state of turbulence under hindered settling conditions, the compact moving bed process in which the catalyst and hydrocarbons are passed either concurrently or countercurrently to each other, and the suspensoid process in which the catalyst is carried into the reaction zone as a slurry in the hydrocarbon oil.

When utilized in conjunction with a reforming process, a particularly preferred process comprises one in which the first step comprises treating the charge stock in the presence of an alumina-platinum-alkali catalyst and hydrogen recycled from the second or reforming step of the process, fractionating the products from the first step to separate the undesirable compounds, and subjecting the treated hydrocarbon fraction to reforming in the presence of a catalyst comprising alumina and from about 0.01% to about 1% by weight of platinum, and still more particularly such a catalyst containing from about 0.1% to about 8% by weight of combined halogen. Hydrogen is separated from the effluent products and the hydrogen is recycled, at least in part, to the first step of the process. It is readily apparent that this combination process results in a very effective process for effecting the desired treatment of the hydrocarbon fraction and will permit the process to be operated for considerably longer periods of time before requiring shut down due to catalyst deactivation.

The following examples are introduced to illustrate further the novelty and utility of the present invention but not with the intention of unduly limiting the same.

Example I

The catalyst used in this example comprised alumina, 0.3% by weight of platinum and 1% by weight of lithium. Alumina pills were prepared by the reaction of ammonium hydroxide with aluminum chloride to form aluminum hydroxide and then pelleting, after which the pills were dried and calcined. The resultant alumina pills were soaked in an aqueous solution of lithium nitrate, after which the pills were dried on a water bath and calcined for 5 hours at about 1800° F. The pills were then impregnated with a chloroplatinic acid solution, dried at about 300° F. and calcined at 932° F. for 3 hours.

The catalyst, as prepared in the above manner, was used for the treatment of a naphtha fraction comprising a blend of approximately 50% straight run naphtha and 50% cracked naphtha. The charge stock had an initial boiling point of 220° F., a bromine number of 34 and contained nitrogen in excess of 125 parts per million. The treatment was effected at an inlet temperature of 750° F., an average catalyst temperature of 800° F., a pressure of 700 pounds per square inch and a space velocity of 6, in the presence of hydrogen in a mol ratio of hydrogen to hydrocarbon of 1:1.

When treated in the above manner, the hydrocarbon fraction was reduced in bromine number from 34 to 2 and in nitrogen content from in excess of 125 to 3 parts per million. The catalyst was used for an additional run, in which substantially equal results were obtained, and after both of these runs, the carbon on the catalyst was very low and amounted to only 0.43% by weight of the catalyst.

Example II

An alumina-platinum-sodium catalyst was prepared which contained 0.3% platinum and 0.3% by weight of sodium. This catalyst was used for the refining of a naphtha fraction having a boiling range of from 233° F. to 398° F., a sulfur content of 2.45%, a nitrogen content of 73 parts per million and a bromine number of 63. The treatment was effected under substantially the same conditions set forth in Example I, except that the hydrogen to hydrocarbon mol ratio was 4:1.

When treated in the above manner, the sulfur content of the hydrocarbon fraction was reduced from 2.45% to 0.19%, the nitrogen content from 73 to 23 parts per million and the bromine number from 63 to 5.

I claim as my invention:

1. A catalyst consisting essentially of alumina, from about 0.01% to about 1% by weight of platinum and from about 0.01% to about 5% by weight of an alkali metal.

2. A catalyst consisting essentially of alumina, from about 0.01% to about 1% by weight of platinum, from about 0.1% to about 1% by weight of combined halogen, and from about 0.01% to about 1% by weight of an alkali metal.

3. A catalyst consisting essentially of alumina, from about 0.01% to about 1% by weight of platinum and from about 0.01% to about 1% by weight of lithium.

4. A catalyst consisting essentially of alumina, from about 0.01% to about 1% by weight of platinum and from about 0.01% to about 1% by weight of sodium.

5. A catalyst consisting essentially of alumina, from about 0.01% to about 1% by weight of platinum and from about 0.01% to about 1% by weight of potassium.

References Cited in the file of this patent

UNITED STATES PATENTS

| | | |
|---|---|---|
| 1,739,306 | Holmes | Dec. 10, 1929 |
| 2,207,868 | Martin | July 16, 1940 |
| 2,331,915 | Kirkpatrick | Oct. 19, 1943 |
| 2,479,110 | Haensel | Aug. 16, 1949 |
| 2,651,598 | Ciapetta | Sept. 8, 1953 |